(12) United States Patent
Horng et al.

(10) Patent No.: US 10,429,060 B2
(45) Date of Patent: Oct. 1, 2019

(54) CEILING FAN MOTOR

(71) Applicant: Sunonwealth Electric Machine Industry Co., Ltd., Kaohsiung (TW)

(72) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 637 days.

(21) Appl. No.: 15/139,381

(22) Filed: Apr. 27, 2016

(65) Prior Publication Data

US 2016/0348894 A1 Dec. 1, 2016

(30) Foreign Application Priority Data

May 28, 2015 (TW) .............................. 104117184 A
Oct. 13, 2015 (TW) .............................. 104133560 A

(51) Int. Cl.
| | |
|---|---|
| *F21V 33/00* | (2006.01) |
| *F04D 19/00* | (2006.01) |
| *F04D 25/06* | (2006.01) |
| *F04D 25/08* | (2006.01) |
| *F21V 17/12* | (2006.01) |

(Continued)

(52) U.S. Cl.
CPC ...... *F21V 33/0096* (2013.01); *F04D 25/0646* (2013.01); *F04D 25/088* (2013.01); *F04D 29/005* (2013.01); *F21V 3/02* (2013.01); *F21V 21/096* (2013.01); *F21V 29/773* (2015.01); *H02K 1/187* (2013.01); *H02K 7/14* (2013.01); *H02K 11/0094* (2013.01); *H02K 21/22* (2013.01); *F21V 17/12* (2013.01); *F21Y 2103/33* (2016.08); *H02K 1/2786* (2013.01)

(58) Field of Classification Search
CPC ........ F21S 8/02; F21Y 21/04; F21Y 2103/00; F21V 21/02; F21V 21/03; F21V 21/04; F21V 21/096; F21V 33/0096; F21V 29/773; F21V 3/02; F21V 17/12; F04D 25/0646; F04D 25/088; H02K 7/14; H02K 11/0094; H02K 21/22; H02K 1/2786
USPC .............................. 362/147, 148, 404; 416/5
See application file for complete search history.

(56) References Cited

U.S. PATENT DOCUMENTS

| | | | |
|---|---|---|---|
| 8,960,989 B2 * | 2/2015 | Van De Ven | ...... H05B 33/0803 362/459 |
| 2006/0226720 A1 * | 10/2006 | Kratz | ................... H02K 19/365 310/73 |

(Continued)

FOREIGN PATENT DOCUMENTS

| | | |
|---|---|---|
| CN | 201159200 Y | 12/2008 |
| CN | 203756567 U | 8/2014 |

(Continued)

*Primary Examiner* — Alan B Cariaso
(74) *Attorney, Agent, or Firm* — Alan D. Kamrath; Mayer & Williams PC

(57) ABSTRACT

A ceiling fan motor with a reduced axial height includes a stator, a rotor and a light-emitting module. The stator includes an iron core and a shaft. The iron core forms an assembly opening at a central portion thereof. The rotor is rotatably coupled with an outer periphery of the shaft and includes a housing. The light-emitting module is at least partially arranged between the iron core and the shaft, or is arranged between the iron core and the housing of the rotor, along a radial direction perpendicular to the shaft.

23 Claims, 11 Drawing Sheets

(51) Int. Cl.
*H02K 1/27* (2006.01)
*H02K 7/14* (2006.01)
*F21V 3/02* (2006.01)
*F21V 21/096* (2006.01)
*H02K 21/22* (2006.01)
*H02K 1/18* (2006.01)
*H02K 11/00* (2016.01)
*F04D 29/00* (2006.01)
*F21V 29/77* (2015.01)
*F21Y 103/33* (2016.01)

(56) References Cited

U.S. PATENT DOCUMENTS

| 2008/0181772 | A1* | 7/2008 | Liu | F04D 25/0633 |
| | | | | 416/5 |
| 2009/0053059 | A1* | 2/2009 | Lung-Fa | F04D 25/088 |
| | | | | 416/5 |
| 2013/0343052 | A1* | 12/2013 | Yen | F21V 33/0096 |
| | | | | 362/235 |
| 2014/0369040 | A1* | 12/2014 | Yen | F21V 33/0096 |
| | | | | 362/235 |
| 2015/0333592 | A1* | 11/2015 | Yin | H02K 5/165 |
| | | | | 310/51 |
| 2016/0168503 | A1* | 6/2016 | Barton | C10M 141/10 |
| | | | | 508/370 |

FOREIGN PATENT DOCUMENTS

| CN | 203857346 U | 10/2014 |
| CN | 203948322 U | 11/2014 |
| CN | 203956567 U | 11/2014 |
| TW | M495485 U | 2/2015 |

* cited by examiner

CEILING FAN MOTOR

CROSS REFERENCE TO RELATED APPLICATIONS

The application claims the benefit of Taiwan application serial Nos. 104117184 and 104133560, respectively filed on May 28, 2015 and Oct. 13, 2015, and the subject matter of which is incorporated herein by reference.

BACKGROUND OF THE INVENTION

1. Field of the Disclosure

The present invention generally relates to a ceiling fan motor having a light-emitting module and, more particularly, to a ceiling fan motor that is provided with a light-emitting module and has a reduced axial height.

2. Description of the Related Art

FIG. 1 shows a conventional ceiling fan 9 having a ceiling fan motor 91, a mounting plate 92, a lampshade 93 and a light-emitting module 94. The ceiling fan motor 91 is fixed to the ceiling and used to drive a blade unit 911 to rotate. The mounting plate 92 is externally coupled with the ceiling fan motor 91. The lampshade 93 is mounted to the mounting plate 92. A receiving space is jointly formed by the mounting plate 92 and the lampshade 93. The light-emitting module 94 is also mounted to the mounting plate 92 and received in the receiving space. In this arrangement, the light of the light-emitting module 94 can be emitted via the lampshade 93. Thus, the ceiling fan 9 possesses both the air-guiding function and illumination function. Such a conventional ceiling fan 9 can be seen in Taiwan Patent No. M495485.

The light-emitting module 94 is mounted to the mounting plate 92 outside the fan motor 91. Therefore, both the mounting plate 92 and the light-emitting module 94 are externally combined with the ceiling fan motor 91, increasing the volume of the ceiling fan 9. As such, when the ceiling fan 9 is installed in a room, the ceiling fan 9 will occupy a larger space. Disadvantageously, space planning is disturbed.

From the above, it is known that the arrangement of the lampshade 93 and the light-emitting module 94 increases the axial height of the ceiling fan 9. Since the ceiling fan 9 is generally mounted to the ceiling of a building, it will not be suitable to install the ceiling fan 9 in a room with a low ceiling. In light of this, it is necessary to provide a novel ceiling fan to improve the utility thereof.

SUMMARY OF THE INVENTION

It is therefore the objective of this invention to provide a ceiling fan motor which includes an iron core, a shaft, a rotor and a light-emitting module. The light-emitting module is at least partially arranged between the iron core and the shaft along a radial direction perpendicular to the shaft, or is arranged between the iron core and the housing of the rotor, to reduce the axial height of the ceiling fan motor.

In an embodiment of the invention, a ceiling fan motor includes a stator, a rotor and a light-emitting module. The stator includes an iron core and a shaft. The iron core forms an assembly opening at a central portion thereof. The rotor is rotatably coupled with an outer periphery of the shaft. The light-emitting module is at least partially arranged between the iron core and the shaft along a radial direction perpendicular to the shaft.

In a form shown, the shaft extends into the assembly opening.

In the form shown, the light-emitting module includes a light-emitting unit which is in a form of an annular light-emitting diode (LED) lamp.

In the form shown, the iron core is connected to a base. The base is located in the assembly opening. The iron core is coupled with the shaft via the base. The base has a shaft hole at a center thereof, and the shaft extends through the shaft hole. The shaft hole has a smaller diameter than a diameter of the assembly opening. The light-emitting module is received in the base.

In the form shown, the rotor includes a housing. The base includes a receiving portion which is a recessed form located between the iron core and the shaft. The receiving portion has a depth extending in an axial direction parallel to the shaft. The light-emitting module is at least partially aligned with the rotor or the iron core along the radial direction.

In the form shown, the light-emitting module includes a light-emitting unit received in the receiving portion of the base.

In the form shown, the light-emitting module includes a light-emitting unit and a lamp seat coupled with the light-emitting unit. The lamp seat is detachably received in the receiving portion of the base. Alternatively, the light-emitting module includes a light-emitting unit and a cooling seat. The cooling seat is detachably attached to the base, and the light-emitting unit is coupled with the cooling seat. The cooling seat may be screwed around the shaft hole of the base. Further alternatively, a male engaging member is arranged on a surface of the cooling seat facing the base, and a female engaging member is arranged on a surface of the base facing the cooling seat. Still alternatively, a male engaging member is arranged on a surface of the base facing the cooling seat, and a female engaging member is arranged on a surface of the cooling seat facing the base. The male and female engaging members can be engaged with or disengaged from each other by an external force.

In the form shown, the ceiling fan motor further includes a lampshade coupled with the lamp seat, and the lampshade is in a flat form.

In the form shown, the base is made of a magnetically conductive material. A magnetic member is mounted on one surface of the lamp seat facing the base, such that the base is magnetically attracted to the lamp seat via the magnetic member. Alternatively, a male engaging member is arranged on a surface of the lamp seat facing the base, and a female engaging member is arranged on a surface of the base facing the lamp seat. The male and female engaging members can be engaged with or disengaged from each other by an external force.

In the form shown, the lamp seat is made of a magnetically conductive material. A magnetic member is mounted on one surface of the base facing the lamp seat, such that the lamp seat is magnetically attracted to the base via the magnetic member. Alternatively, a male engaging member is arranged on a surface of the base facing the lamp seat, and a female engaging member is arranged on a surface of the lamp seat facing the base. The male and female engaging members can be engaged with or disengaged from each other by an external force.

In the form shown, the ceiling fan motor further includes a lampshade coupled with the stator, and the lampshade is in a flat form.

In another embodiment of the invention, a ceiling fan motor includes a stator, a rotor and a light-emitting module. The stator includes an iron core and a shaft. The iron core forms an assembly opening at a central portion thereof. The rotor is rotatably coupled with an outer periphery of the shaft and includes a housing. The light-emitting module is at least partially arranged between the iron core and the housing along a radial direction perpendicular to the shaft.

In a form shown, a gap is formed between the iron core and the housing along the radial direction, and the light-emitting module is received in the gap.

In the form shown, the stator includes a radial extension portion, and the light-emitting module is coupled with the radial extension portion. The radial extension portion extends from the iron core towards the housing, and the light-emitting module is at least partially aligned with the rotor or the iron core along the radial direction.

Based on the above structures, since the light-emitting module in the individual embodiments of the invention is arranged either between the iron core and the shaft or between the iron core and the housing of the rotor along the radial direction, it is possible to align the light-emitting module with the rotor or the iron core. As such, the arrangement of the light-emitting module will not increase the axial height of the ceiling fan motor, thereby improving the utility of the ceiling fan motor.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
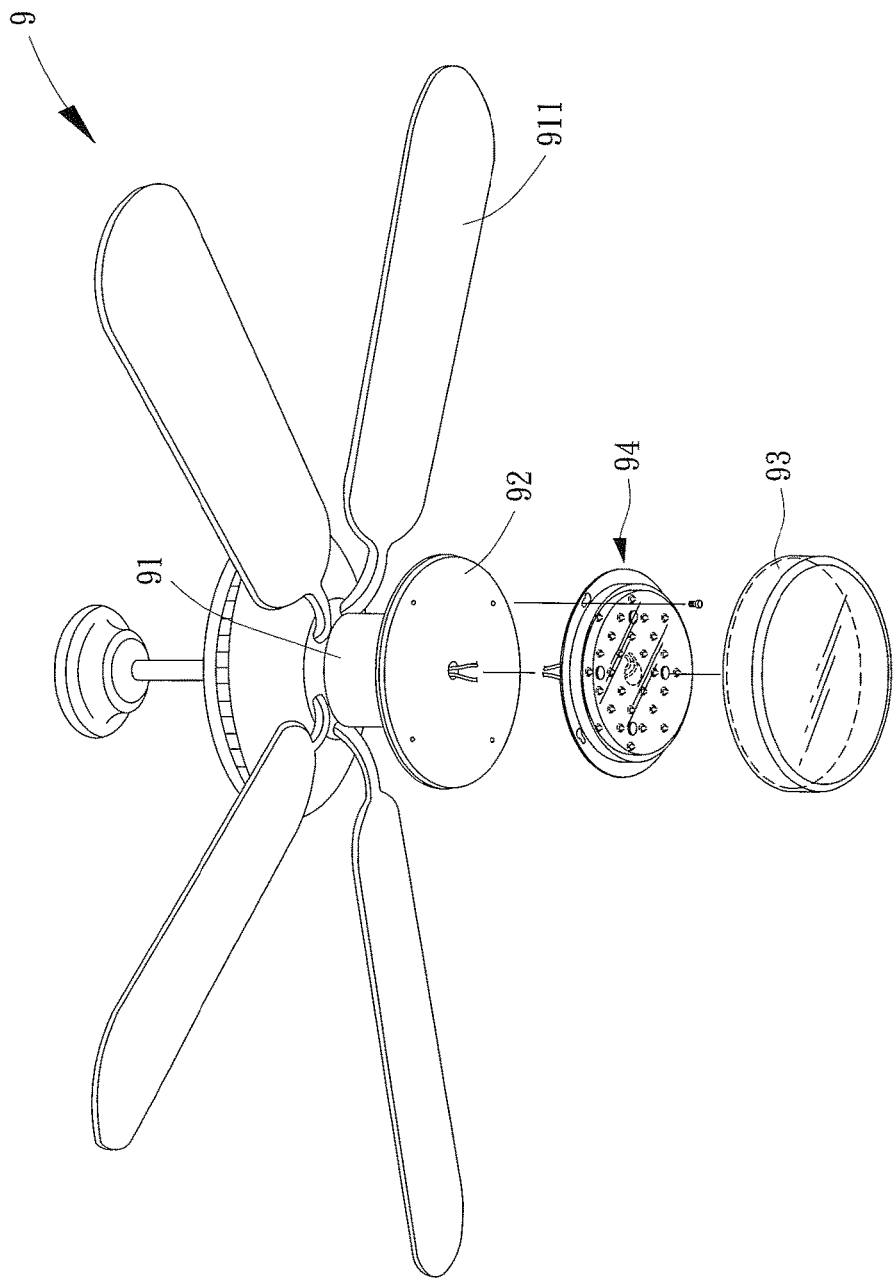
FIG. 1 is an exploded view of a conventional ceiling fan.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
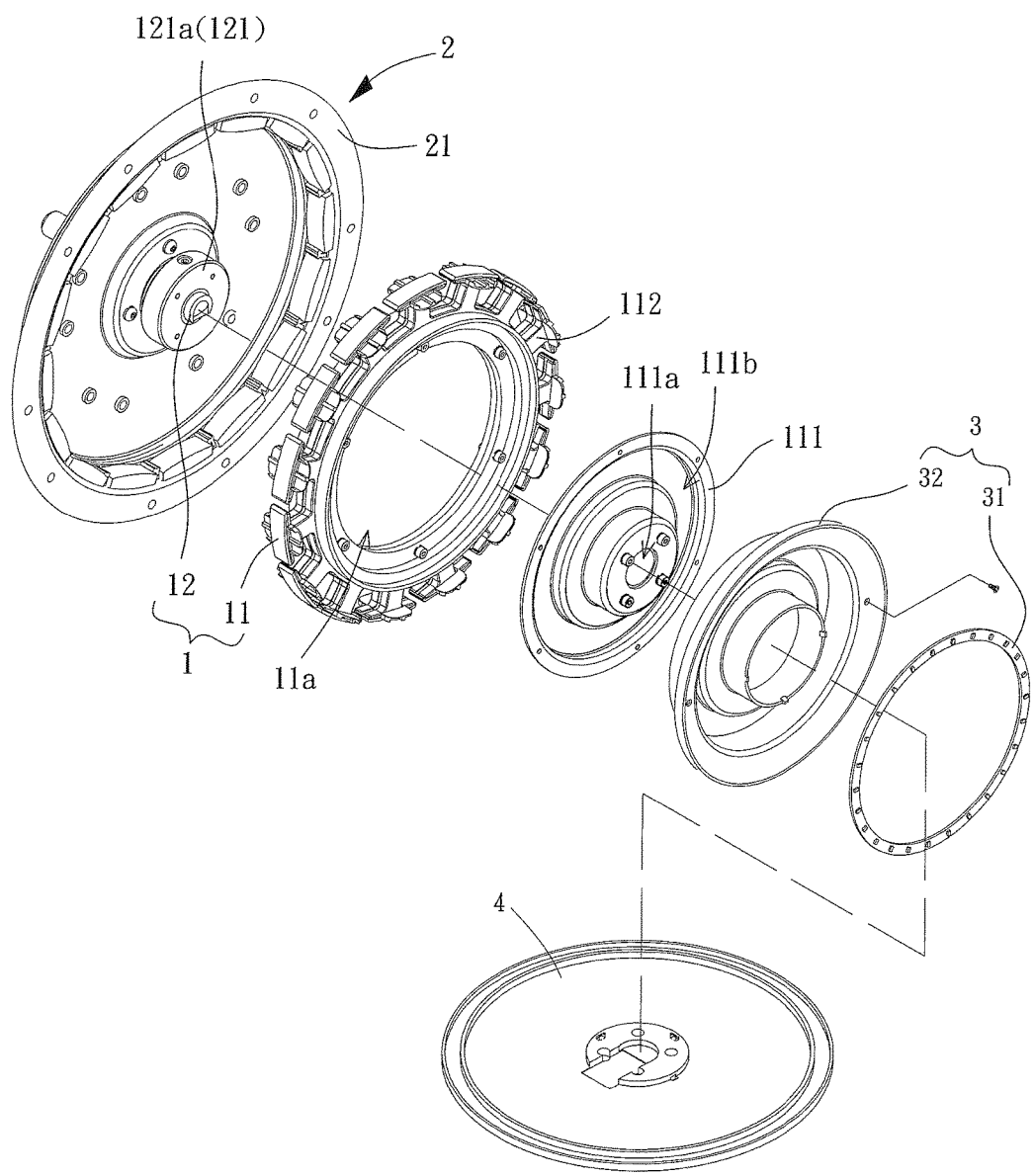
FIG. 2 is an exploded view of a ceiling fan according to a first embodiment of the invention.
Figure 3:
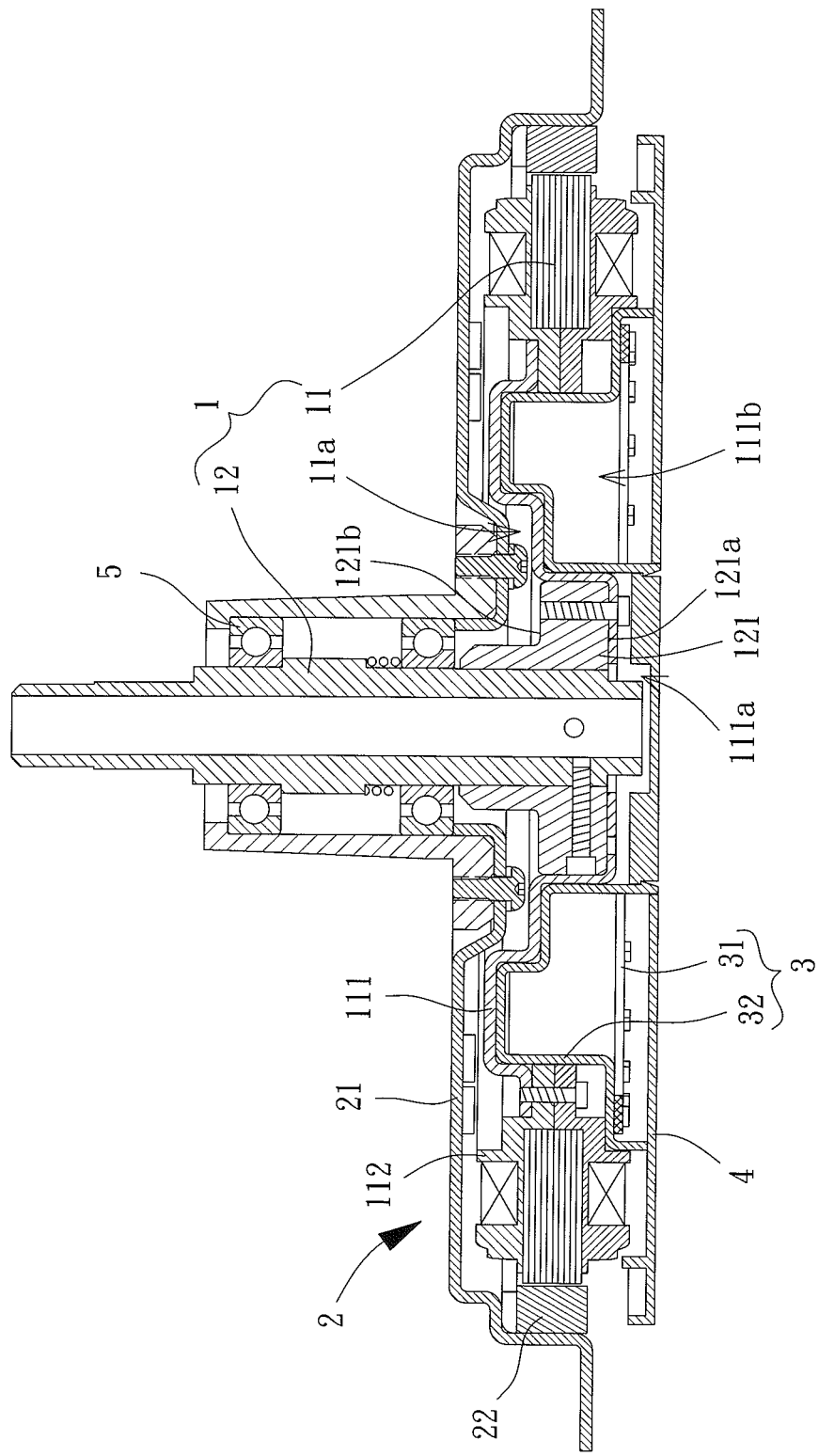
FIG. 3 is a cross sectional view of the ceiling fan of the first embodiment of the invention.

FIGS. 2 and 3 show a ceiling fan motor having a light-emitting module according to a first embodiment of the invention. The ceiling fan motor includes a stator 1, a rotor 2 and a light-emitting module 3. The rotor 2 is rotatably coupled with the stator I. The stator 1 includes an iron core 11 and a shaft 12. The light-emitting module 3 is at least partially arranged between the iron core 11 and the shaft 12.

The iron core 11 may be in the form of a plurality of stacked silicon steel plates, or in the form of an integrally-formed monolithic piece made of a magnetically conductive material. The iron core 11 includes an assembly opening 11a at the central portion thereof. The shaft 12 may extend into the assembly opening 11a. The iron core 11 may couple with the shaft 12. In the embodiment, the iron core 11 is connected to a base 111 which is located in the assembly opening 11a. The base 111 has a shaft hole 111a at the center thereof. The shaft 12 extends through the shaft hole 111a. The shaft hole 111a has a smaller diameter than that of the assembly opening 11a. The iron core 11 may couple with the shaft 12 via the base 111. Alternatively, the shaft 12 may couple with a support 121 as shown in FIGS. 2 and 3. In this arrangement, two edges of the base 111 (inner and outer edges) may couple with the iron core 11 and the support 121, respectively. Thus, the iron core 11 is able to couple with the shaft 12 via the base 111. The base 111 may couple with the iron core 11 by ways of screwing, engagement, adhesion or tenoning. The base 111 may also be integrally formed with the iron core 11. The base 111 may couple with the support 121 by ways of screwing, engagement, adhesion or tenoning.

The support 121 may include a bottom face 121a and a shoulder portion 121b. The bottom face 121a and the shoulder portion 121b are located at two sides of the support 121 along an axial direction parallel to the shaft. The shoulder portion 121b is located between the bottom face 121a and the rotor 2. The inner edge of the base 111 may further extend to the bottom face 121a. Alternatively, referring to FIG. 4 which shows another implementation of the first embodiment, the inner edge of the base 111 may extend radially to the support 121 in order to connect to the shoulder portion 121b of the support 121.

The base 111 may be made of a conducting material such as metal. An insulation bobbin 112 may couple with the outer periphery of the iron core 11. The insulation bobbin 112 is made of an insulating material such as plastic, and the base 111 is coupled with the insulation bobbin 112. In this arrangement, the insulation bobbin 112 may be wound with a coil unit and prevents an electric current from flowing between the iron core 11 and the base 111.

Referring to FIGS. 2 and 3, the rotor 2 is rotatably coupled with an outer periphery of the shaft 12. In this embodiment, the ceiling fan motor is an outer-rotor motor. The rotor 2 may include a housing 21 and a permanent magnet unit 22. The permanent magnet unit 22 may couple with an inner periphery of the housing 21 and faces the outer periphery of the iron core 11. A spacing is formed between the iron core 11 and the permanent magnet unit 22.

The light-emitting module 3 is at least partially arranged between the iron core 11 and the shaft 12 along a radial direction perpendicular to the shaft 12. Namely, the light-emitting module 3 may be received in the base 111. Specifically, the base 111 includes a receiving portion 111b which is in a recessed form located between the iron core 11 and the shaft 12. The receiving portion 111b has a depth extending in the axial direction. The light-emitting module 3 may be received in the receiving portion 111b and is disposed into the base 111 to allow the light-emitting module 3 to be at least partially aligned with the rotor 2 or the iron core 11 along the radial direction perpendicular to the shaft 12.

More specifically, the light-emitting module 3 may be completely received in the receiving portion 111b so that the entire light-emitting module 3 is positioned between the iron core 11 and the shaft 12. Alternatively, the light-emitting module 3 may be partially received in the receiving portion 111b, such that a part of the light-emitting module 3 is arranged between the iron core 11 and the shaft 12 along the radial direction perpendicular to the shaft 12 while another part of the light-emitting module 3 protrudes out of the base 111. Based on this, the light-emitting module 3 may be fully or partially aligned with the rotor 2 or the iron core 11 along the radial direction perpendicular to the shaft 12.

The light-emitting module 3 may include a light-emitting unit 31 which may be an incandescent bulb (conventional bulb), a fluorescent bulb (including the general fluorescent bulb and the compact fluorescent bulb), or a light-emitting diode (LED) lamp. Since the shaft 12 extends through the base 111 at the center thereof, the receiving portion 111 bis in the annular form. Accordingly, the light-emitting unit 31 may be an annular LED lamp. However, the light-emitting unit 31 may also be a plurality of bulbs annularly arranged in the receiving portion 111b, or may be an annular lamp tube. The light-emmiting module 3 may further include a lamp seat 32 detachably received in the receiving portion 111b of the base 111. The light-emitting unit 31 is coupled with the lamp seat 32 so that the light-emitting unit 31 can be received in the receiving portion 111b via the lamp seat 32. In addition, the lamp seat 32 may include electric components such as a ballast, a power converter or a circuit protection element provided for the light-emitting unit 31. The lamp seat 32 can be coupled with the base 111 in a detachable manner such as by screwing, tenoning, etc. As such, when the light-emitting unit 31 of the light-emitting module 3 or other electronic component malfunctions, the light-emitting module 3 may be removed from the stator 1 for replacement or maintenance, providing a convenient use of the ceiling fan motor.

Figure 4:
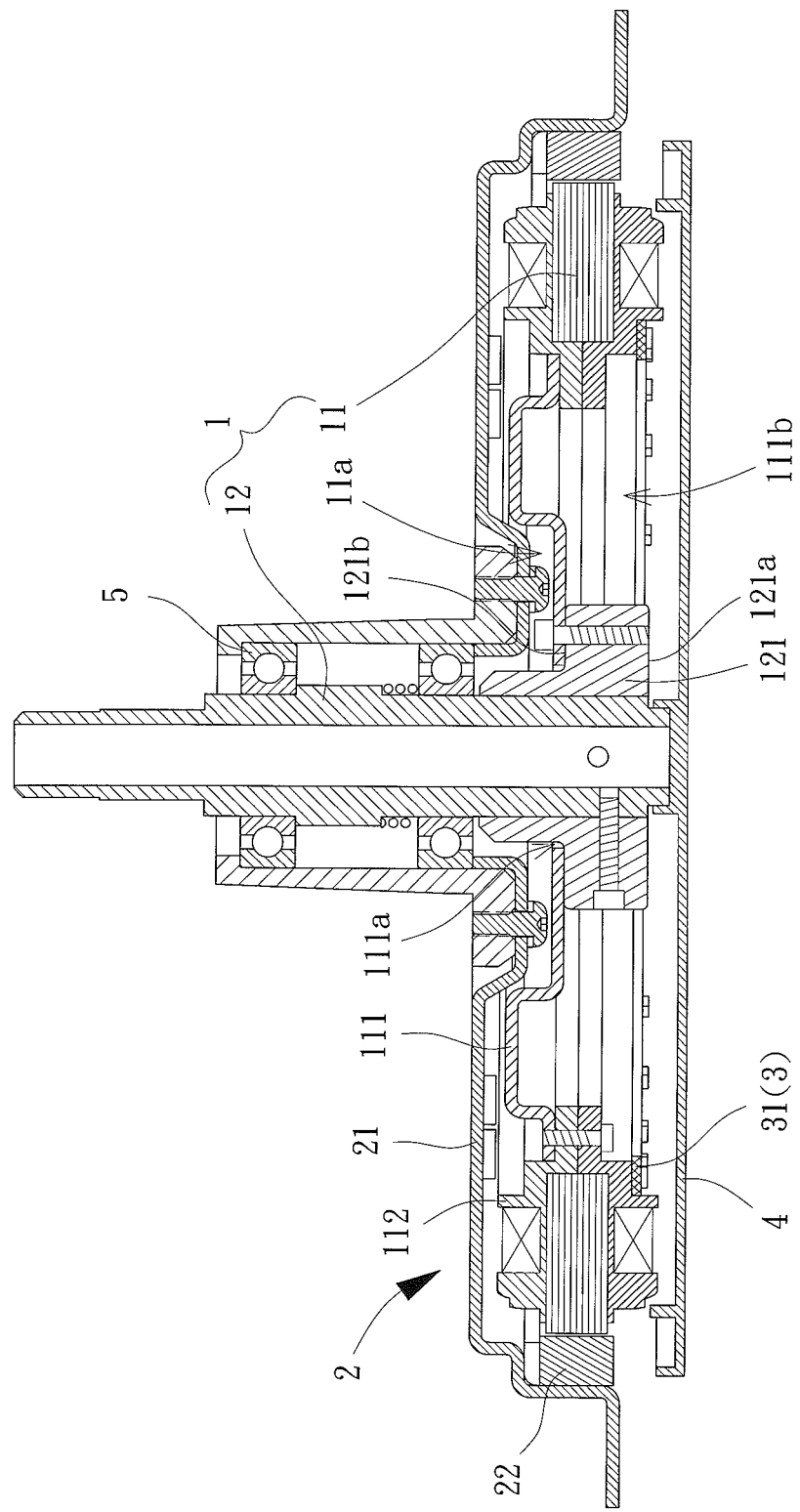
FIG. 4 is a cross sectional view of the ceiling fan according to another implementation of the first embodiment of the invention.

However, in a modification of the first embodiment as shown in FIG. 4, the light-emitting module 3 is not provided with the lamp seat 32. In other words, the light-emitting unit 31 may be directly received in the receiving portion 111b of the base 111. The coupling mechanism between the light-emitting unit 31 and the stator 1 is not limited in the invention.

Besides, the ceiling fan motor further includes a lampshade 4 in the embodiment. The lampshade 4 couples with the lamp seat 32 to enclose the light-emitting module 3. The lampshade 4 is made of a light-permeable material to allow the light of the light-emitting unit 31 to pass therethrough. Since the light-emitting module 3 is arranged between the iron core 11 and the shaft 12 along the radial direction perpendicular to the shaft 12, the lampshade 4 does not need to form a receiving space for receiving the light-emitting module 3. Thus, the lampshade 4 can be thin and be in a substantially flat form. Since the lampshade 4 is substantially in a flat form along the radial direction, the lampshade 4 will not increase the axial height of the ceiling fan motor.

When the ceiling fan motor in the embodiment is in use, the shaft 12 may be fixed to a predetermined location such as the ceiling. In this regard, a bearing 5 may couple with the outer periphery of the shaft 12, and the rotor 2 may couple with the outer periphery of the bearing 5. In this arrangement, the rotor 2 may be rotatably coupled with the outer periphery of the shaft 12. Furthermore, the housing 21 of the rotor 2 may couple with a blade unit (not shown) of a ceiling fan. The blade unit may couple with the ceiling fan motor to construct a ceiling fan.

Based on the above structure, in the ceiling fan motor according to the first embodiment of the invention, since the light-emitting module 3 is at least partially aligned with the rotor 2 or the iron core 11 along the radial direction perpendicular to the shaft 12 (by arranging the light-emitting module 3 at least partially between the iron core 11 and the shaft 12 in said radial direction), the light-emitting unit 31 or electronic components of the light-emitting module 3 are prevented from extending beyond the axial extent of the ceiling fan motor. Advantageously, arrangement of the light-emitting module 3 will not increase the axial height of the ceiling fan motor. Moreover, although the lampshade 4 is provided in the embodiment, arrangement of the lampshade 4 will not increase the axial height of the ceiling fan motor since the lampshade 4 is thin and substantially flat along the radial direction.

Figure 5:
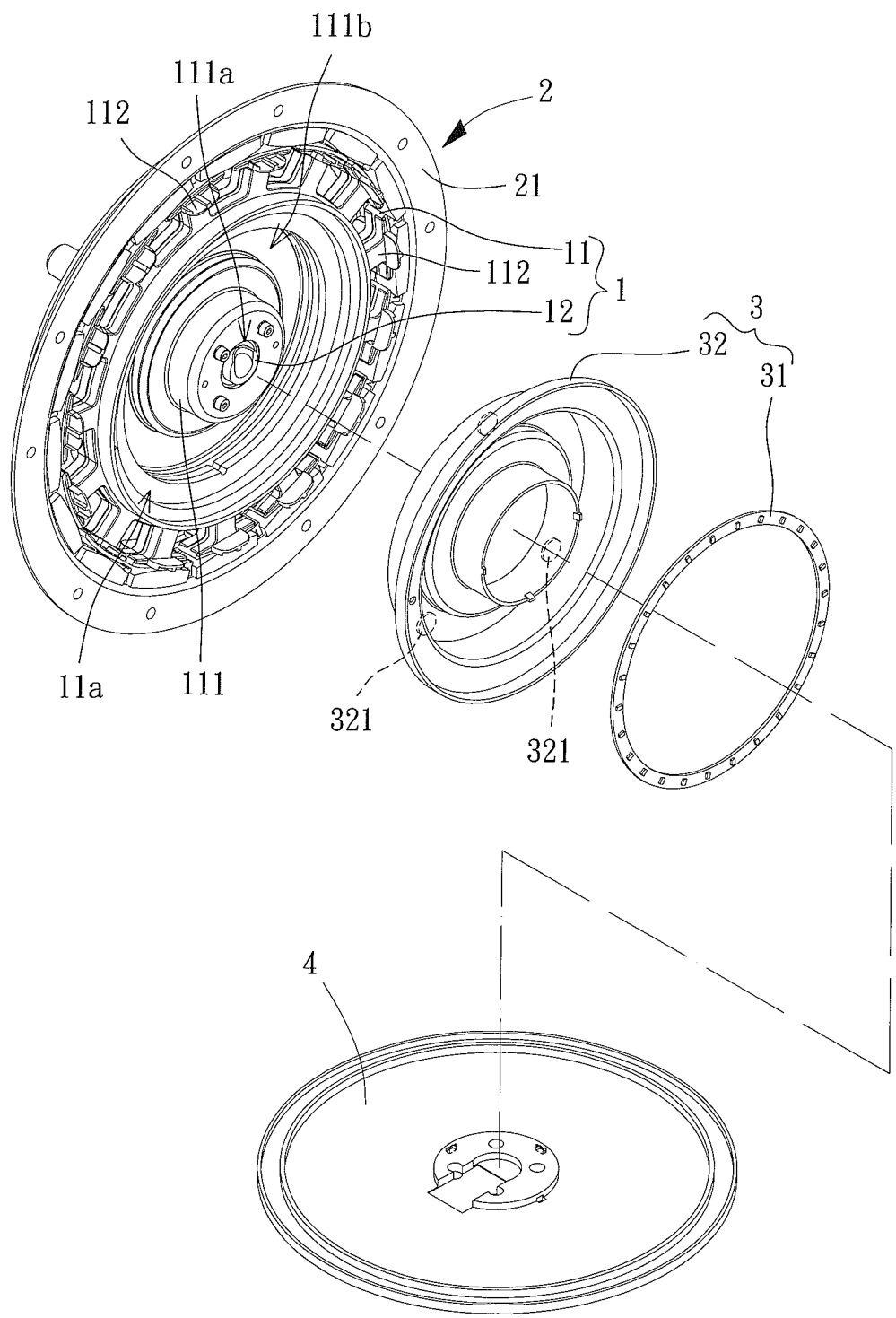
FIG. 5 is an exploded view of a ceiling fan according to a second embodiment of the invention.

Referring to FIG. 5, a ceiling fan motor is shown according to a second embodiment of the invention. The second embodiment differs from the first embodiment in that the base 111 is made of a magnetically conductive material (including iron, cobalt or nickel). Based on this, a magnetic member 321 may be mounted on one surface of the lamp seat 32 facing the base 111, such that the base 111 can be magnetically attracted to the lamp seat 32 via the magnetic member 321. In this arrangement, the lamp seat 32 is coupled with the base 111 in a detachable manner. Since the lamp seat 32 is coupled with the base 111 under the magnetic force, the light-emitting module 3 can be easily removed from the stator 1 when the light-emitting module 3 malfunctions. Similarly, a new light-emitting module 3 or the repaired light-emitting module 3 can be mounted back to the base 111 easily, improving the utility of the ceiling fan motor.

Figure 5A:
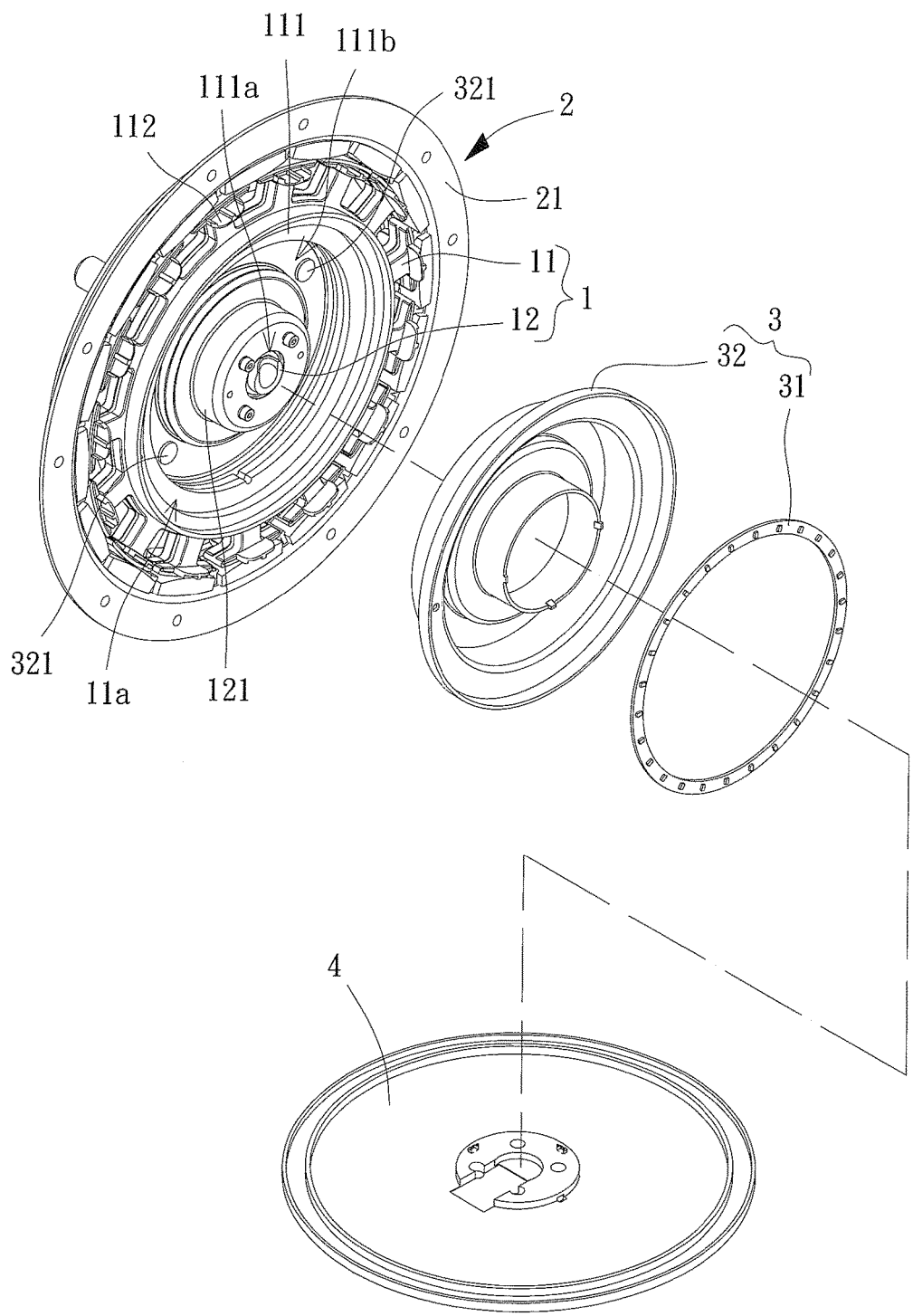
FIG. 5a is an exploded view of the ceiling fan according to another implementation of the second embodiment of the invention.

Similarly, referring to FIG. 5a, the lamp seat 32 of the light-emitting module 3 can be made of a magnetically conductive material, and the magnetic member 321 may be mounted on one surface of the base 111 facing the lamp seat 32. In the option, the lamp seat 32 is coupled with the base 111 also under the magnetic force, improving the utility of the ceiling fan motor.

Figure 6:
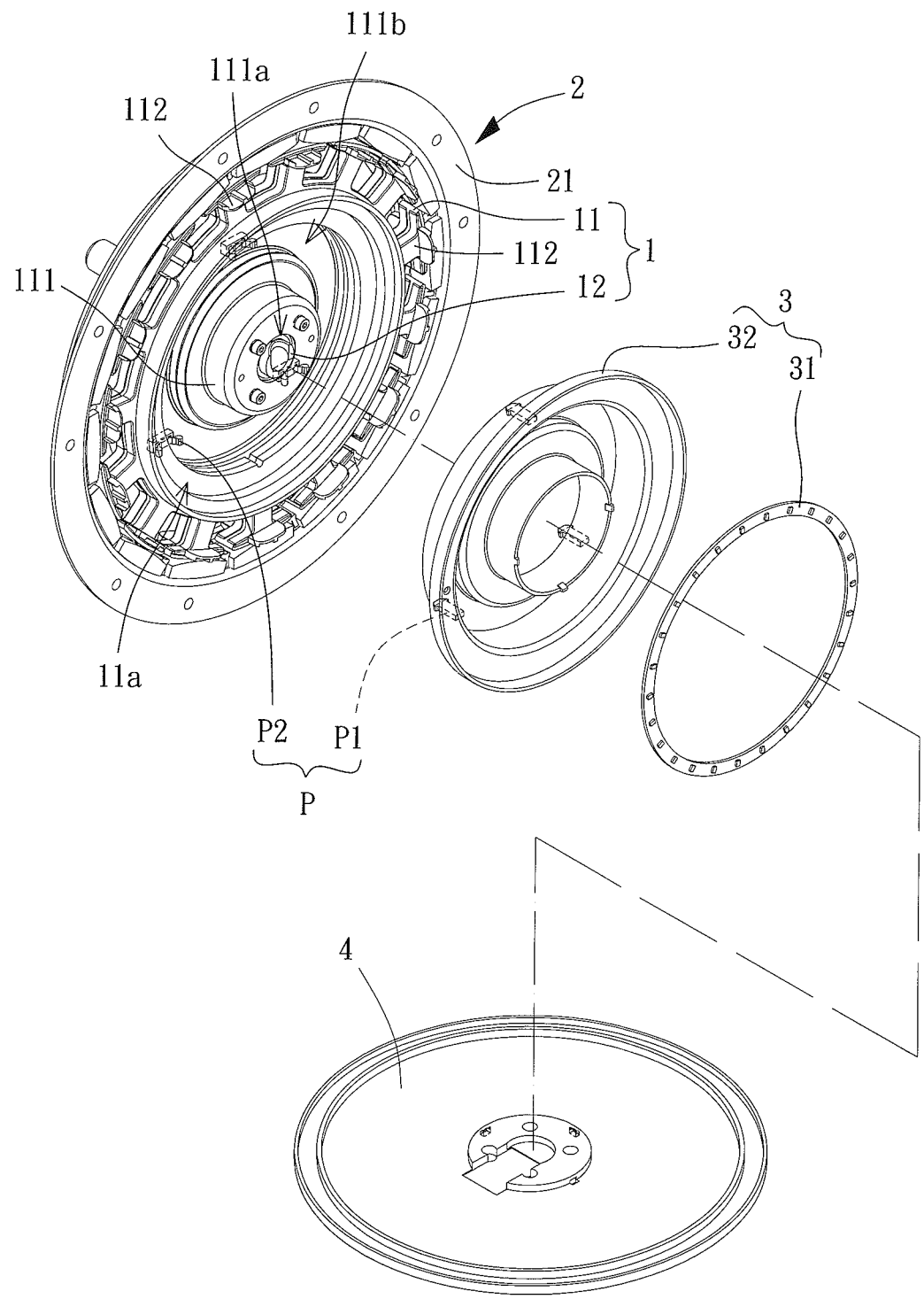
FIG. 6 is an exploded view of a ceiling fan according to a third embodiment of the invention.

Referring to FIG. 6, a ceiling fan motor is shown according to a third embodiment of the invention. The ceiling fan motor in the embodiment differs from that in the first embodiment in that the base 111 of the iron core 11 and the lamp seat 32 of the light-emitting module 3 may be engaged with each other via an engagement assembly "P" (such as engaging them with each other by a pressing force). For example, the engagement assembly "P" may include a male engaging member P1 and a female engaging member P2. The male engaging member P1 may be arranged on the surface of the lamp seat 32 facing the base 111, and the female engaging member P2 may be arranged on the surface of the base 111 facing the lamp seat 32. The male and female engaging members P1 and P2 may be engaged with or disengaged from each other by an external force, thereby detachably engaging the lamp seat 32 with the base 111. In the arrangement, the base 111 and the lamp seat 32 are engaged with each other via the engagement assembly "P" as stated above. Therefore, when the light-emitting module 3 malfunctions, the light-emitting module 3 can be conveniently detached from the stator 1 by pressing the light-emitting module 3 against the base 111 of the stator 1. Similarly, when a new light-emitting module 3 is to be attached to the base 111, said module 3 may be engaged with the base 111 by pressing said module 3 against the base 111 of the stator 1. As such, the utility of the ceiling fan motor can be improved.

Similarly, the surface of the base 111 facing the lamp seat 32 may be provided with the male engaging member P1, and the surface of the lamp seat 32 facing the base 111 may be provided with the female engaging member P2 (not shown). As such, the base 111 and the lamp seat 32 may be engaged with or disengaged from each other by pressing the base 111 and the lamp seat 32 against each other, thus improving the utility of the ceiling fan motor. Furthermore, the base 111 and the lamp seat 32 may be engaged with or disengaged from each other via a plurality of engagement assemblies "P." In this regard, several or all of the male engaging members P1 may be arranged on the base 111 or the lamp seat 32. For example, there may be two male engaging members P1 and one female engaging member P2 arranged on the surface of the base 111 facing the lamp seat 32, and there may be two female engaging members P2 and one male engaging member P1 arranged on the surface of the lamp seat 32 facing the base 111. However, the quantities mentioned above are not used to limit the invention.

Figure 7:
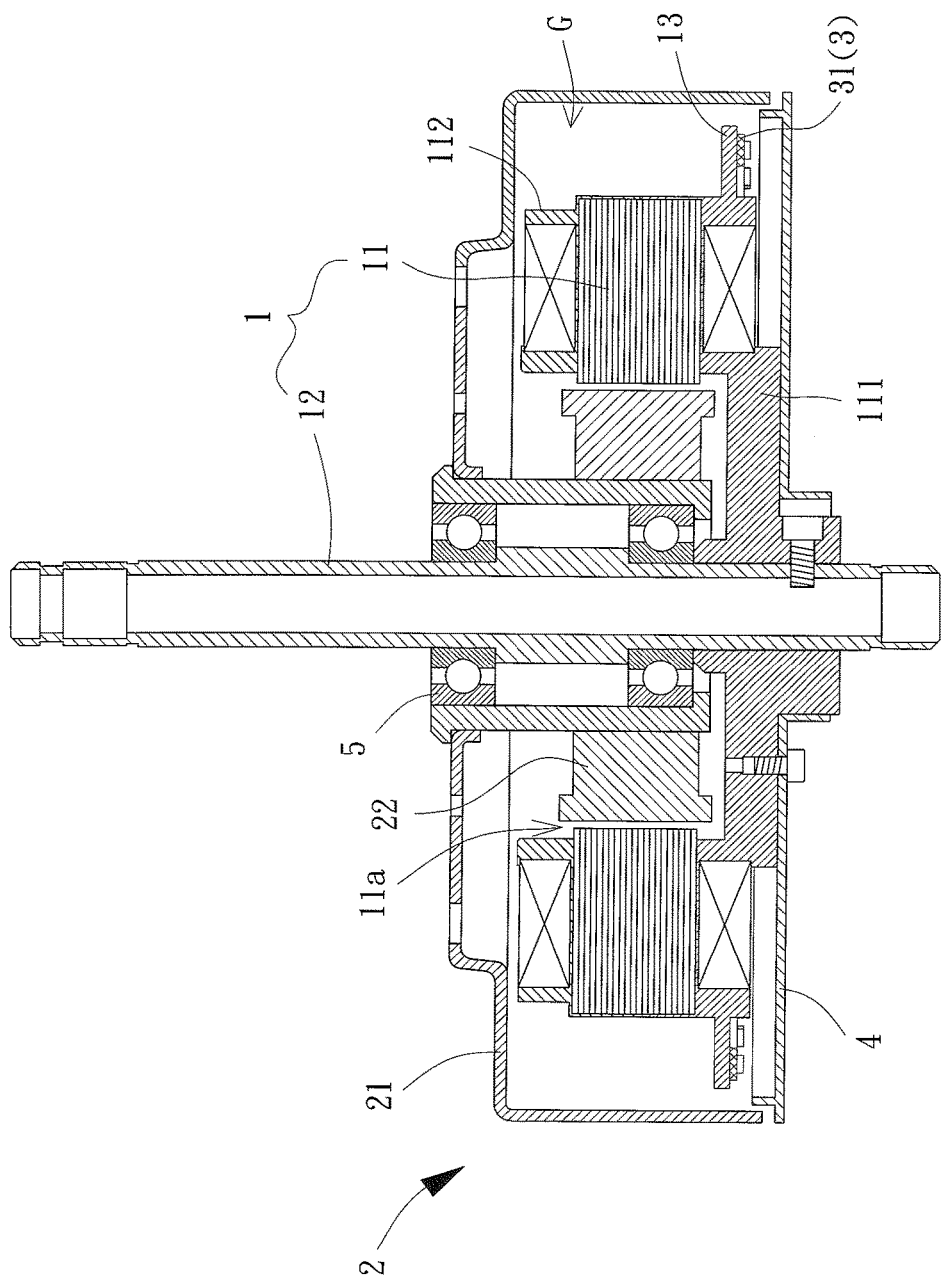
FIG. 7 is a cross sectional view of a ceiling fan according to a fourth embodiment of the invention.

Referring to FIG. 7, a ceiling fan motor is shown according to a fourth embodiment of the invention. Similar to the first embodiment, the ceiling fan motor also includes a stator 1, a rotor 2 and a light-emitting module 3. In this embodiment, however, the light-emitting module 3 is at least partially arranged between the iron core 11 and the housing 21 of the rotor 2. Specifically, the ceiling fan motor in this embodiment is an inner-rotor motor where the rotor 2 can include a permanent magnet unit 22. The permanent magnet unit 22 is rotatably coupled with the shaft 12 and faces the inner periphery of the iron core 11, with an air gap formed between the permanent magnet unit 22 and the iron core 11. A bearing 5 may be coupled with the outer periphery of the shaft 12, and the permanent magnet unit 22 is coupled with the outer periphery of the bearing 5. As such, the rotor 2 is rotatably coupled with the shaft 12.

At least a part of the light-emitting module 3 is arranged between the iron core 11 and the housing 21 along the radial direction perpendicular to the shaft 12. Specifically, a gap "G" is formed between the iron core 11 and the housing 21 along the radial direction perpendicular to the shaft 12. The light-emitting module 3 may be received in the gap "G" In this embodiment, the stator 1 includes a radial extension portion 13, and the light-emitting module 3 is coupled with the radial extension portion 13. The radial extension portion 13 may be provided on the iron core 11, and may be coupled or integrally formed with the insulation bobbin 112. The radial extension portion 13 extends from the iron core 11 towards the housing 21. Therefore, the radial extension portion 13 is formed in the gap "G," rendering the light-emitting module 3 to be at least partially aligned with the rotor 2 or the iron core 11 along the radial direction perpendicular to the shaft 12.

Based on the above structure, the light-emitting module 3 is arranged at least partially between the iron core 11 and the housing 21 along the radial direction perpendicular to the shaft 12 in the fourth embodiment. As such, the light-emitting module 3 can be at least partially aligned with the rotor 2 or the iron core 11 along the radial direction perpendicular to the shaft 12. In this manner, arrangement of the light-emitting module 3 will also not increase the axial height of the ceiling fan motor.

Besides, the embodiment also includes a lampshade 4. However, the lampshade 4 is coupled with the stator 1. Since the light-emitting module 3 is arranged between the iron core 11 and the housing 21, the lampshade 4 can also be thin and be in a flat form along the radial direction perpendicular to the shaft 12. According to the discussed embodiments of the invention, the lampshade 4 may couple with the lamp seat 32 of the light-emitting module 3 or the stator 1.

Figure 8:
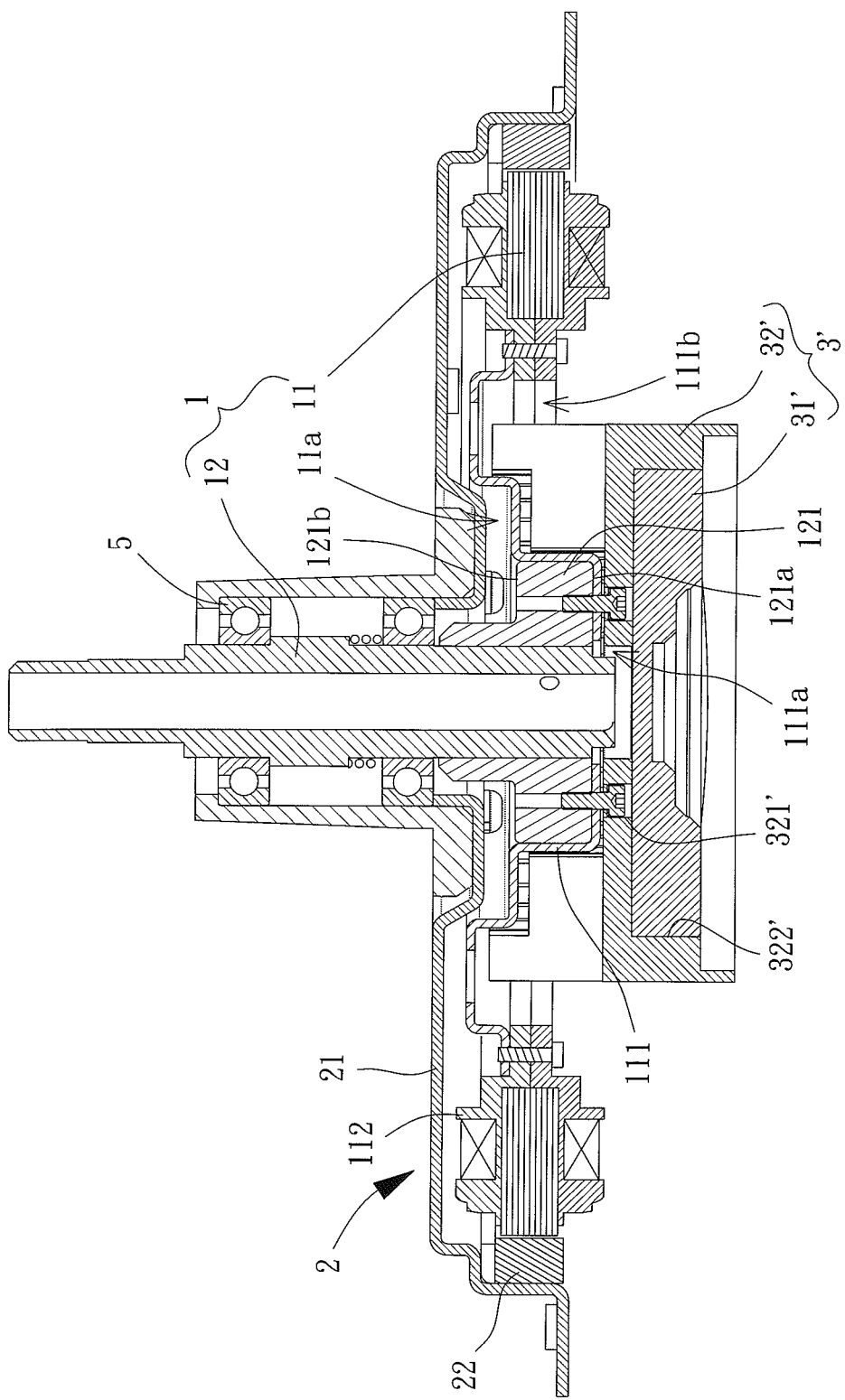
FIG. 8 is a cross sectional view of a ceiling fan according to a fifth embodiment of the invention.
Figure 9:
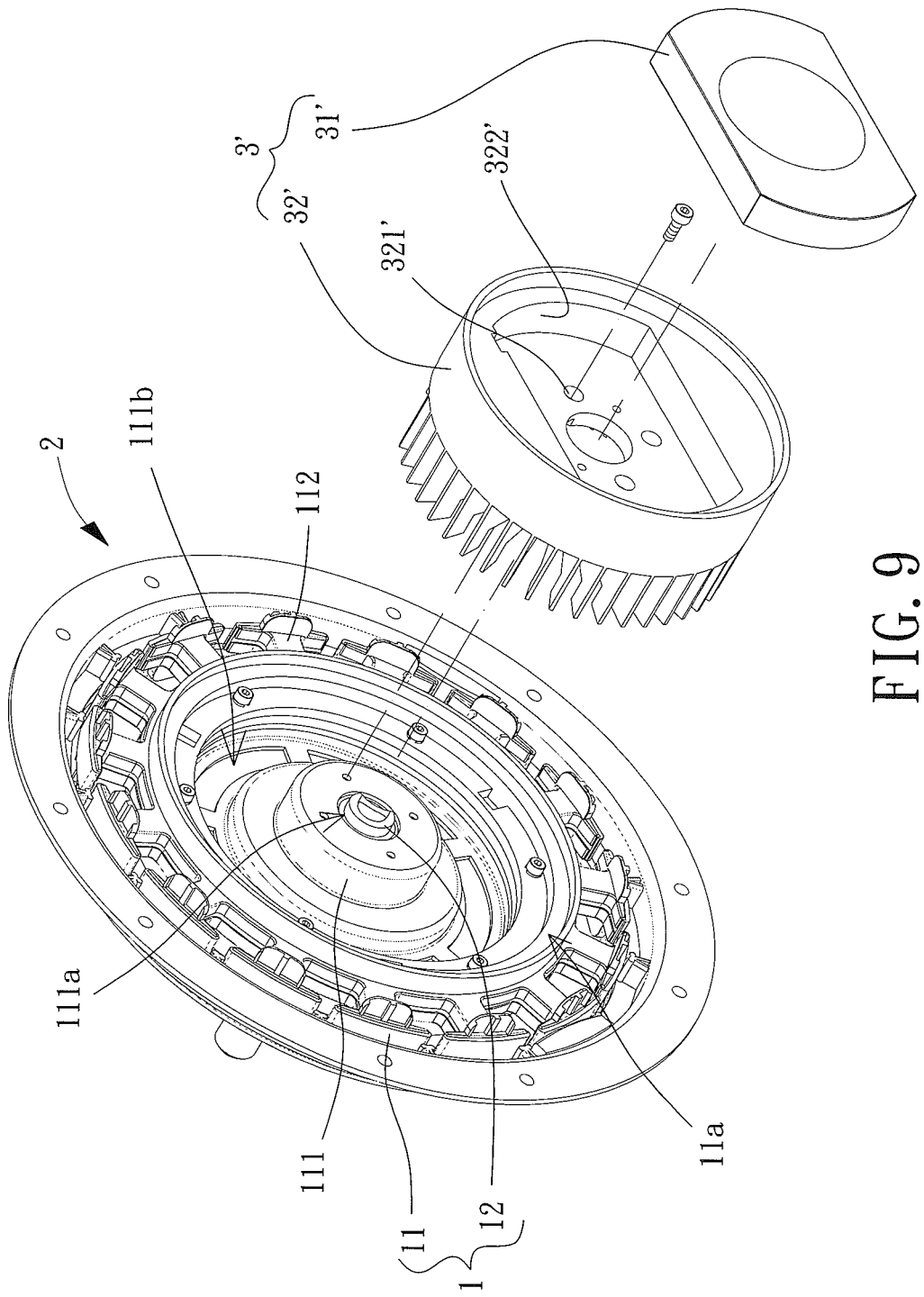
FIG. 9 is an exploded view of the ceiling fan of the fifth embodiment of the invention.

Referring to FIGS. 8 and 9, a ceiling fan motor is shown according to a fifth embodiment of the invention. Similar to the first embodiment, the ceiling fan motor also includes the stator 1, the rotor 2 and a light-emitting module 3'. The light-emitting module 3' is at least partially arranged between the iron core 11 of the stator 1 and the shaft 12. The light-emitting module 3' may include a light-emitting unit 31' and a cooling seat 32'. The cooling seat 32' is detachably attached to the iron core 11 or the shaft 12 of the stator 1. The light-emitting unit 31' (such as a LED light-emitting module) may be coupled with the cooling seat 32'. In the embodiment, the cooling seat 32' may be a cooling module formed by the metal material with better heat conductivity. The shape of the cooling seat 32' may be changed according to the environment or the required cooling efficiency. For example, the cooling seat 32' may be provided with cooling fins (as shown in FIG. 9). The cooling seat 32' may include a plurality of coupling portions 321' and a receiving chamber 322'. Based on this, the cooling seat 32' may be attached to the base 111 of the stator 1 via the plurality of coupling portions 321'. Each of the plurality of coupling portions 321' may be in the form of a coupling hole. Based on this, a plurality of screws may be arranged around the shaft hole 111a of the base 111 and may screw the cooling seat 32' to the base 111, as shown in FIG. 8. However, this is not used to limit the invention. The light-emitting unit 31' may be received in the receiving chamber 322'. The receiving chamber 322' may form a recess for receiving the light-emitting unit 31', such that the contact area between the cooling seat 32' and the light-emitting unit 31' is increased. Advantageously, the heat conducting efficiency and the cooling efficiency can be improved.

Figure 10:
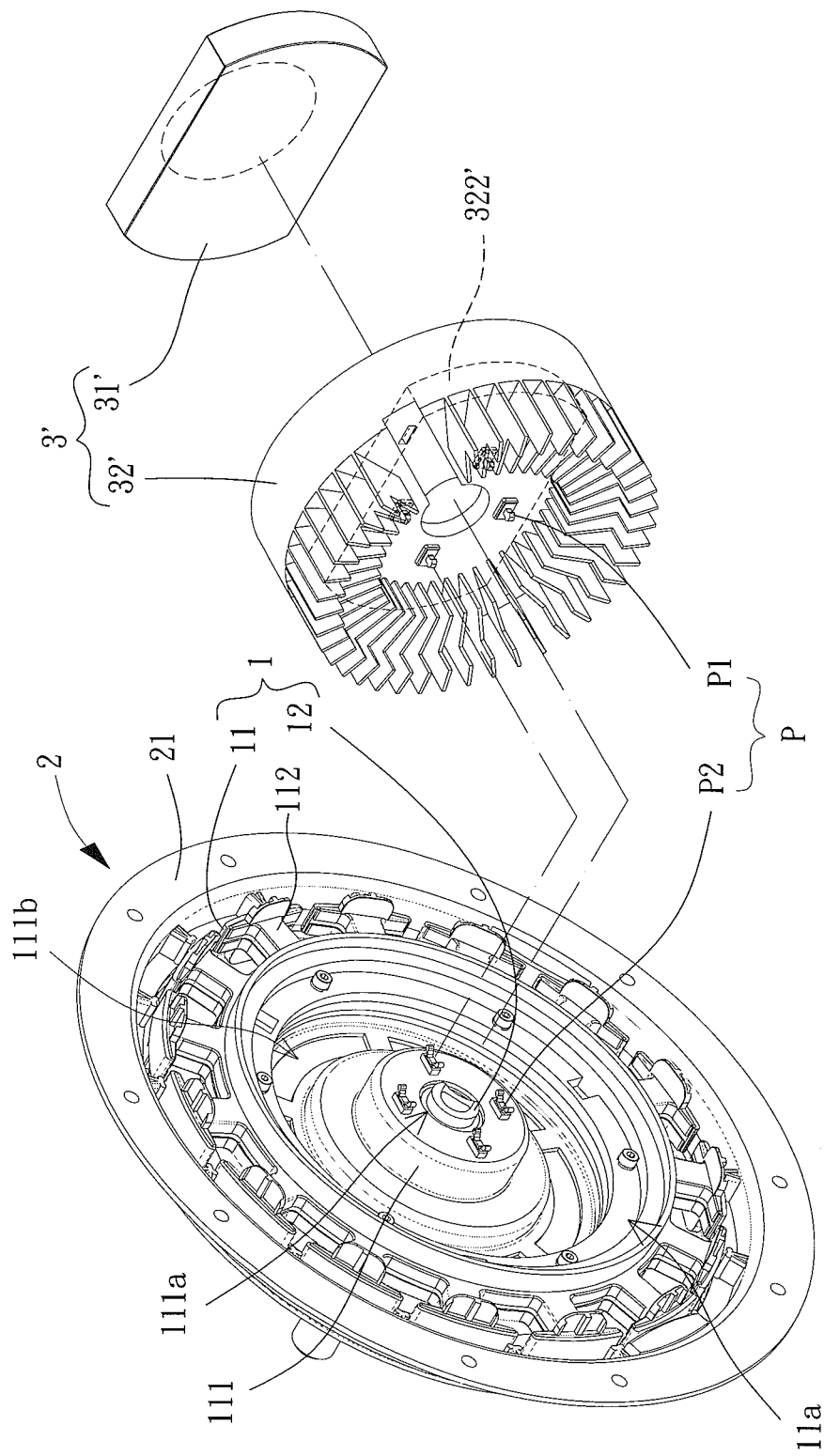
FIG. 10 is an exploded view of a ceiling fan according to a sixth embodiment of the invention.

Referring to FIG. 10, a ceiling fan motor is shown according to a sixth embodiment of the invention. The ceiling fan motor in this embodiment differs from that in the fifth embodiment in that the base 111 of the stator I and the cooling seat 32' may be engaged with each other via at least one engagement assembly "P" (such as engaging the stator 1 and the cooling seat 32' with each other by a pressing force). For example, the male engaging member(s) P1 may be arranged on the surface of the cooling seat 32' facing the base 111, and the female engaging member(s) P2 may be arranged on the surface of the base 111 facing the cooling seat 32' (the female engaging member(s) P2 may be arranged, for example, around the shaft hole 111a). Alternatively, the male engaging member(s) P1 may be arranged on the surface of the base 111 facing the cooling seat 32', and the female engaging member(s) P2 may be arranged on the surface of the cooling seat 32' facing the base 111. Thus, the cooling seat 32' can be conveniently attached to the base 111. In the arrangement, the base 111 and the cooling seat 32' are engaged with each other via the engagement assembly "P" as stated above. Therefore, when the light-emitting unit 31' malfunctions, the cooling seat 32' can be conveniently detached from the stator 1 by pressing the cooling seat 32' against the base 111 of the stator 1. As such, maintenance or replacement of the light-emitting unit 31' is convenient, and the utility of the ceiling fan motor is improved.

Based on the above structures, the ceiling fan motors in the above embodiments are described below.

Specifically, by arranging the light-emitting module 3 at least partially between the iron core 11 and the shaft 12 along the radial direction perpendicular to the shaft 12, or between the iron core 11 and the housing 21 of the rotor 2, the light-emitting module 3 can be at least partially aligned with the rotor 2 or the iron core 11 along the radial direction perpendicular to the shaft 12. Hence, the arrangement of the light-emitting module 3 will not increase the axial height of the ceiling fan motor. As compared with the conventional ceiling fan motor 9 where the light-emitting module 94 is arranged outside the fan motor 91 and adversely results in a larger volume, the ceiling fan motors in the individual embodiments of the invention have relatively small axial heights and provide an improved utility.

Furthermore, when the ceiling fan motor includes the lampshade 4, the lampshade 4 may be in the flat form along the radial direction perpendicular to the shaft 12. Advantageously, the axial height of the ceiling fan motor is not increased, and the arrangements of the light-emitting module 3 and the lampshade 4 can achieve a reduced axial height of the ceiling fan motor.

As a conclusion of the above, the ceiling fan motors of the invention do have the smaller axial heights and improved utility.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A ceiling fan motor comprising:
   a stator comprising an iron core and a shaft, wherein the iron core forms an assembly opening at a central portion thereof;
   a rotor rotatably coupled with an outer periphery of the shaft, wherein the rotor has an inner periphery delimiting a hollow volume, wherein the shaft is mounted at a center of the hollow volume, and wherein the iron core is received in the hollow volume and is located radially between the inner periphery of the rotor and the shaft; and
   a light-emitting module at least partially arranged in the hollow volume and between the iron core and the shaft along a radial direction perpendicular to the shaft.

2. The ceiling fan motor as claimed in claim 1, wherein the shaft extends into the assembly opening.

3. The ceiling fan motor as claimed in claim 1, wherein the light-emitting module comprises a light-emitting unit which is in a form of an annular light-emitting diode (LED) lamp.

4. The ceiling fan motor as claimed in claim 1, wherein the iron core is connected to a base, wherein the base is located in the assembly opening, wherein the iron core is coupled with the shaft via the base, wherein the base has a shaft hole at a center thereof, wherein the shaft extends through the shaft hole, wherein the shaft hole has a smaller diameter than a diameter of the assembly opening, and wherein the light-emitting module is received in the base.

5. The ceiling fan motor as claimed in claim 4, wherein the base comprises a receiving portion which is in a recessed form located between the iron core and the shaft, wherein the receiving portion has a depth extending in an axial direction parallel to the shaft, and wherein the light-emitting module is at least partially aligned with the rotor or the iron core along the radial direction perpendicular to the shaft.

6. The ceiling fan motor as claimed in claim 5, wherein the light-emitting module comprises a light-emitting unit received in the receiving portion of the base.

7. The ceiling fan motor as claimed in claim 5, wherein the light-emitting module comprises a light-emitting unit and a lamp seat coupled with the light-emitting unit, and wherein the lamp seat is detachably received in the receiving portion of the base.

8. The ceiling fan motor as claimed in claim 7, further comprising a lampshade coupled with the lamp seat, wherein the lampshade is in a flat form.

9. The ceiling fan motor as claimed in claim 7, wherein the base is made of a magnetically conductive material, wherein a magnetic member is mounted on one surface of the lamp seat facing the base, and wherein the base is magnetically attracted to the lamp seat via the magnetic member.

10. The ceiling fan motor as claimed in claim 7, wherein the lamp seat is made of a magnetically conductive material, wherein a magnetic member is mounted on one surface of the base facing the lamp seat, and wherein the lamp seat is magnetically attracted to the base via the magnetic member.

11. The ceiling fan motor as claimed in claim 7, wherein a male engaging member is arranged on a surface of the lamp seat facing the base, wherein a female engaging member is arranged on a surface of the base facing the lamp seat, and wherein the male and female engaging members engage with or disengage from each other by an external force.

12. The ceiling fan motor as claimed in claim 7, wherein a male engaging member is arranged on a surface of the base facing the lamp seat, wherein a female engaging member is arranged on a surface of the lamp seat facing the base, and wherein the male and female engaging members engage with or disengage, from each other by an external force.

13. The ceiling fan motor as claimed in claim 4, wherein the light-emitting module comprises a light-emitting unit and a cooling seat, wherein the cooling seat is detachably attached to the base, and wherein the light-emitting unit is coupled with the cooling seat.

14. The ceiling fan motor as claimed in claim 13, wherein the light-emitting unit is received in the cooling seat.

15. The ceiling fan motor as claimed in claim 13, wherein the cooling seat is screwed around the shaft hole of the base.

16. The ceiling fan motor as claimed in claim 13, wherein a male engaging member is arranged on a surface of the cooling seat facing the base, wherein a female engaging member is arranged on a surface of the base facing the cooling seat, and wherein the male and female engaging members engage with or disengage from each other by an external force.

17. The ceiling fan motor as claimed in claim 13, wherein a male engaging member is arranged on a surface of the base facing the cooling seat, wherein a female engaging member is arranged on a surface of the cooling seat facing the base, and wherein the male and female engaging members engage with or disengage from each other by an external force.

18. The ceiling fan motor as claimed in claim 1, further comprising a lampshade coupled with the stator, wherein the lampshade is in a flat form.

19. A ceiling fan motor comprising:
   a stator comprising an iron core, a shaft, and a base, wherein the iron core forms an assembly opening at a central portion thereof, wherein the base is located in the assembly opening;
   a rotor rotatably coupled with an outer periphery of the shaft and comprising an inner periphery delimiting a hollow volume, wherein the shaft is mounted at a center of the hollow volume, wherein the iron core is received in the h How volume, and wherein a gap is formed between the iron core and the inner periphery of the rotor; and a light-emitting module received in the gap and located radially between the iron core and the inner periphery of the rotor, wherein the iron core is located radially between the light-emitting module and the shaft.

20. The ceiling fan motor as claimed in claim 19, wherein the shaft extends into the assembly opening.

21. The ceiling fan motor as claimed in claim 19, wherein the light-emitting module comprises a light-emitting unit which is in a form of an annular light-emitting diode (LED) lamp.

22. The ceiling fan motor as claimed in claim 19, wherein the stator comprises a radial extension portion, wherein the light-emitting module is coupled with the radial extension portion, wherein the radial extension portion extends from the iron core towards the inner periphery, and wherein the light-emitting module is at least partially aligned with the rotor or the iron core along the radial direction perpendicular to the shaft.

23. The ceiling fan motor as claimed in claim 19, further comprising a lampshade coupled with the stator, wherein the lampshade is in a flat form.

* * * * *